United States Patent [19]

Wise

[11] Patent Number: 4,839,573
[45] Date of Patent: Jun. 13, 1989

[54] METHOD AND APPARATUS FOR FEEDBACK CONTROL LOOP BANDWIDTH AND PHASE MARGIN REGULATION

[76] Inventor: William L. Wise, 3568 Amherst Ct., Mountain View, Calif. 94040

[21] Appl. No.: 897,676

[22] Filed: Aug. 18, 1986

[51] Int. Cl.$^4$ ............................................. G05B 5/01
[52] U.S. Cl. .................................... 318/615; 318/611; 318/619
[58] Field of Search ............... 318/615, 616, 617, 618, 318/611, 619, 620, 621, 609, 610, 632

[56] References Cited

U.S. PATENT DOCUMENTS

| | | | |
|---|---|---|---|
| 4,143,311 | 3/1979 | Lee | 318/611 |
| 4,300,081 | 11/1981 | Van Laudingham | 318/616 X |
| 4,434,458 | 2/1984 | Kazahaya | 318/615 X |
| 4,446,409 | 5/1984 | Rawicz et al. | 318/615 X |
| 4,449,082 | 5/1984 | Webster | 318/618 X |
| 4,498,036 | 2/1985 | Salemka | 318/615 X |
| 4,498,037 | 2/1985 | Razavi | 318/615 X |

FOREIGN PATENT DOCUMENTS 0239809  11/1985  Japan ..................................... 318/615

OTHER PUBLICATIONS

Richard L. Melton Real-Time Adaptive Velocity Control May 1986, vol. 12, No. 5, pp. 40-44.

Primary Examiner—Bentsu Ro
Attorney, Agent, or Firm—Kenneth R. Allen

[57] ABSTRACT

Method and apparatus for providing selfadaptive feedback control loop bandwidth and phase margin regulation automatically, to rapidly and predictably closely compensate for externally-caused bandwidth and phase margin changes, such as caused by changing load inertia presented to an actuator. Regulation is effected by controlling a loop-bandwidth correcting compensation element whose change is rendered equal to that of the loop affecting external change, but opposite in phase and change in magnitude. In a preferred embodiment, a correcting apparatus is within an internal feedback control loop which, by automatically compensating against a stated allowable range of uncorrected bandwidth variation, provides uniform static and dynamic bandwidth regulation for both internal feedback control loop and, therefore, regulation of the feedback control loop bandwidth and phase margin. Change-sensing for operation of the internal feedback control loop is accomplished by synchronous detection means employing a very low-level carrier signal whose frequency is set close to the preset bandwidth of the feedback control loop of interest.

19 Claims, 4 Drawing Sheets

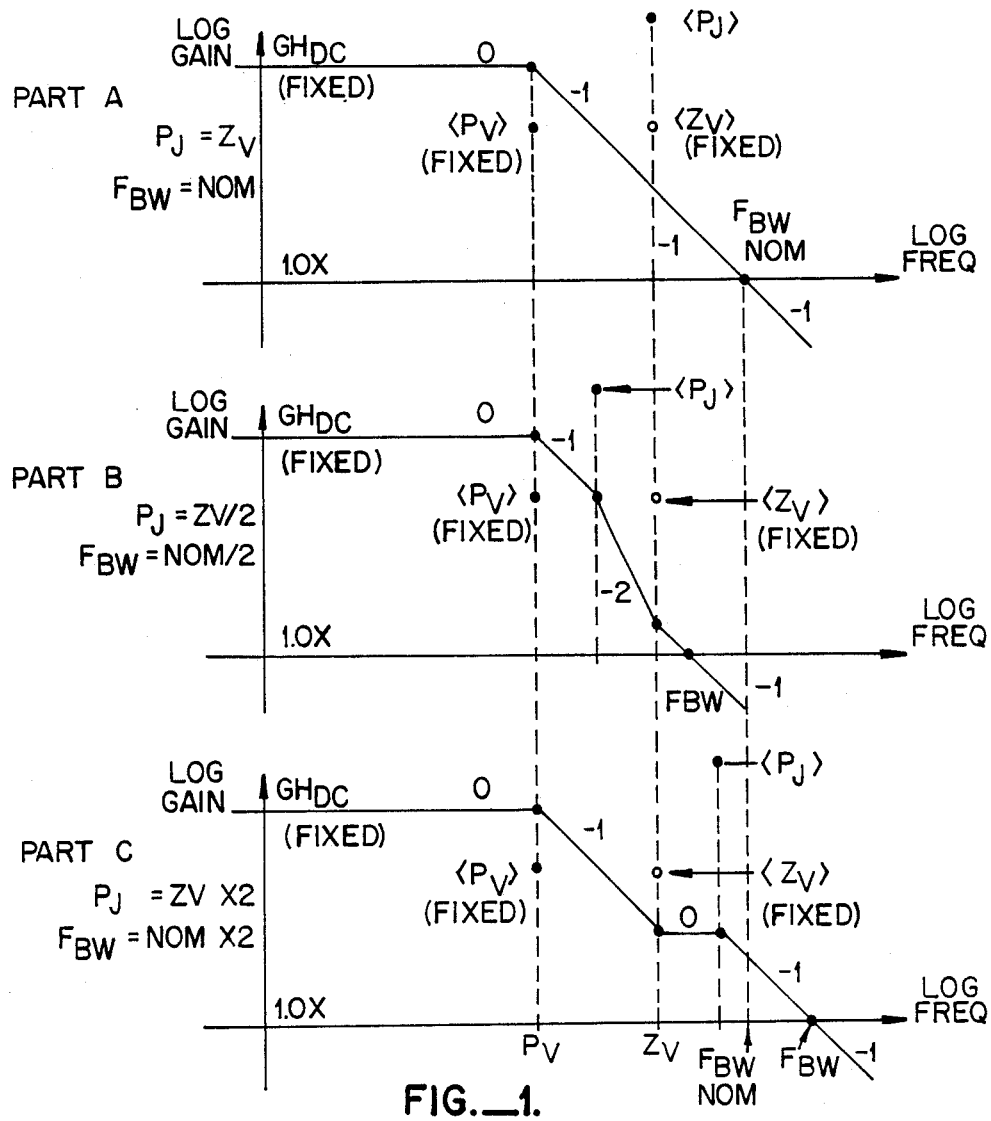
FIG._1.
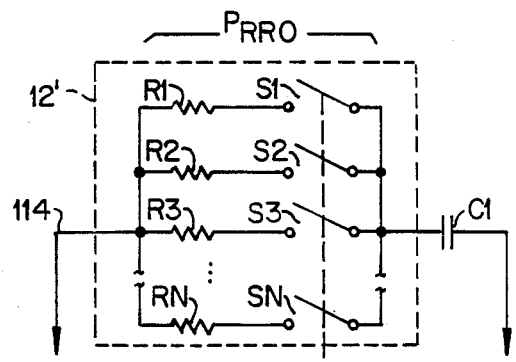
FIG._5.

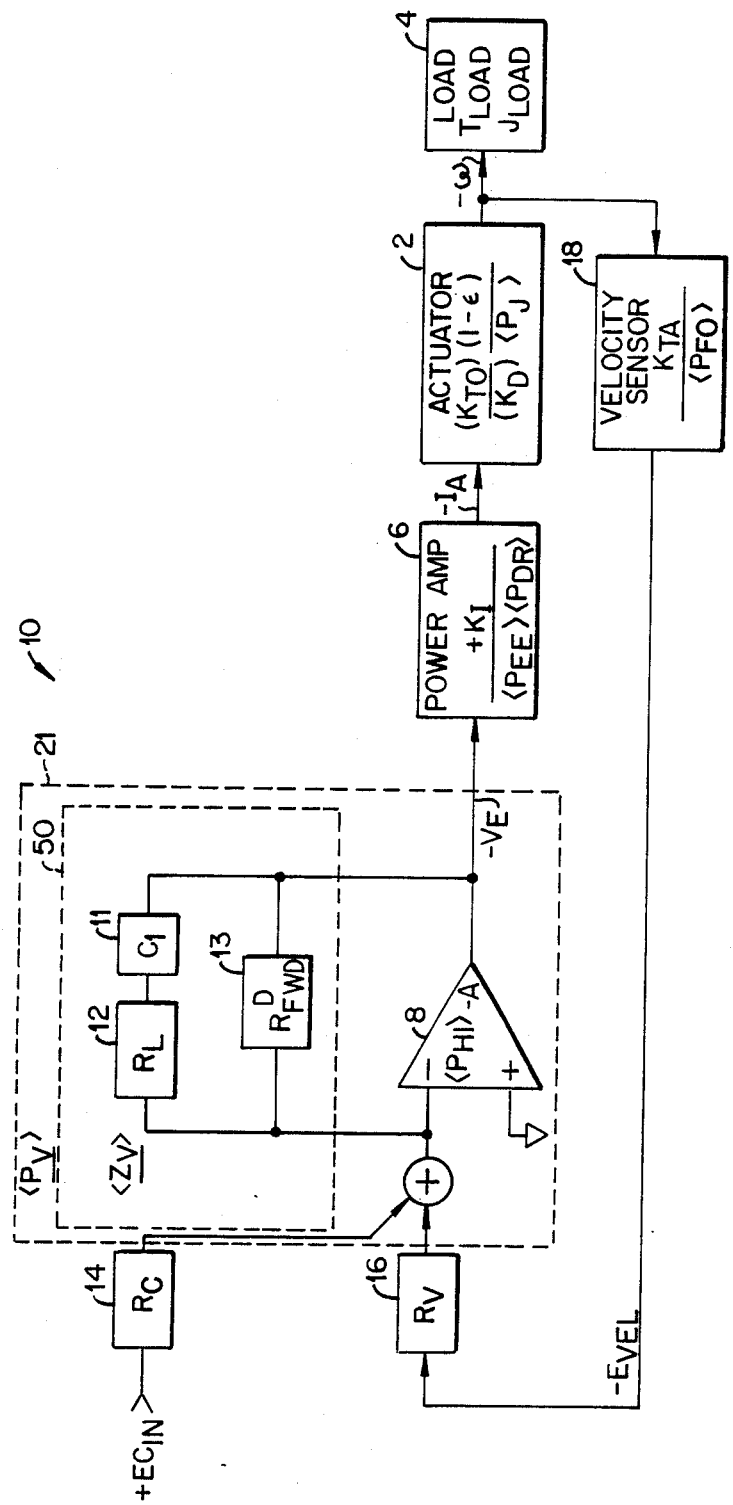
FIG._2.
PRIOR ART

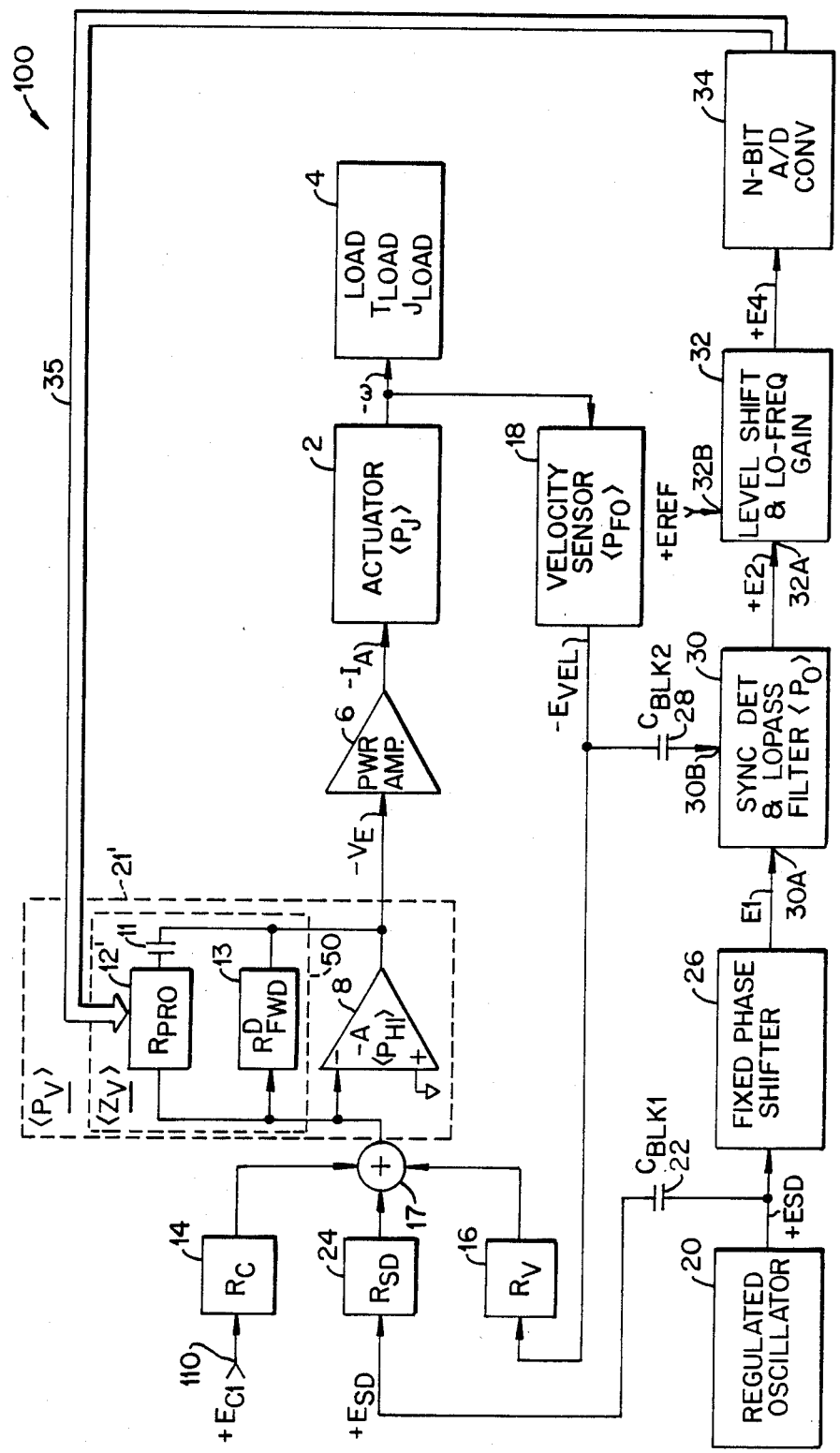
FIG._3.

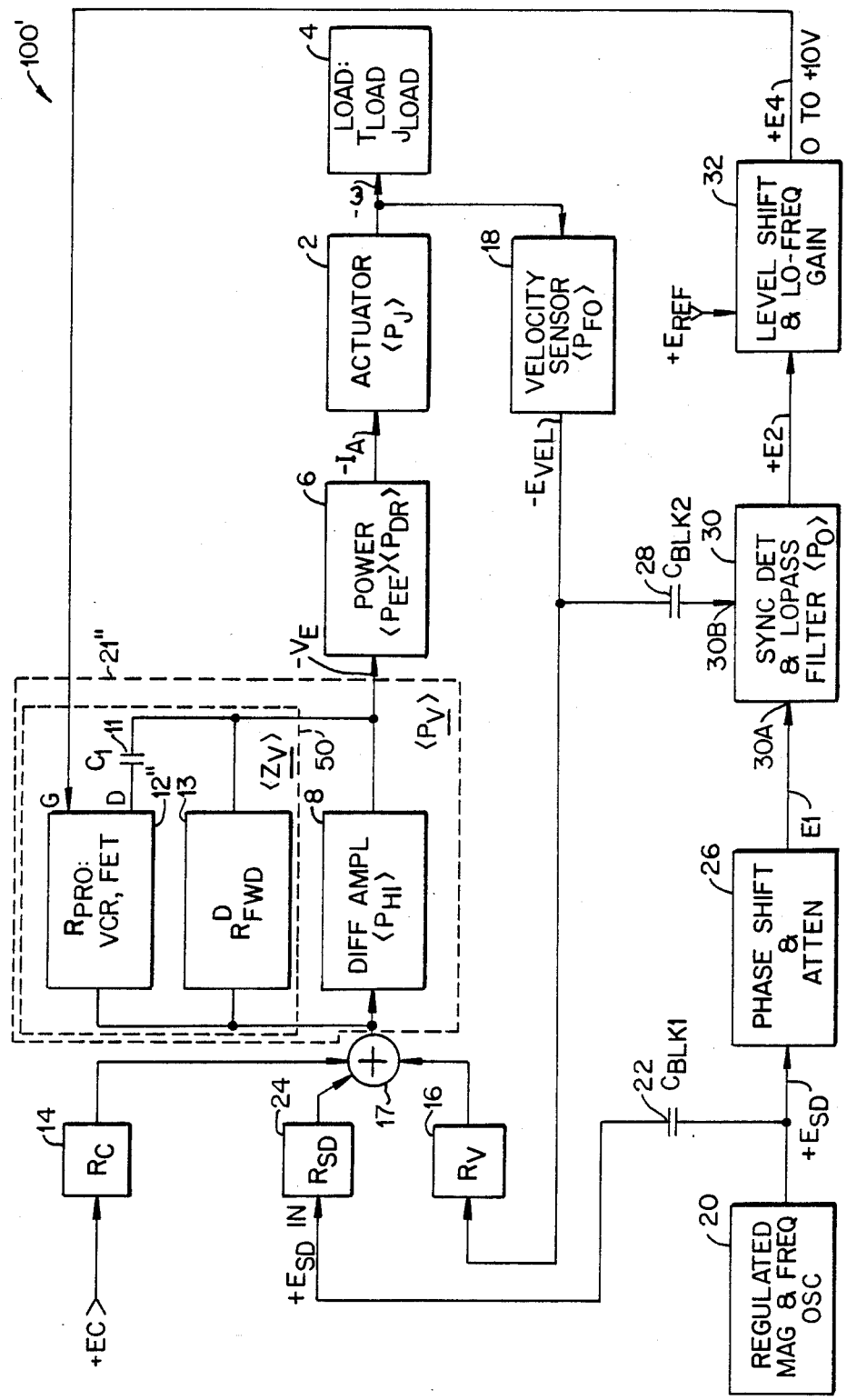
FIG._4.

METHOD AND APPARATUS FOR FEEDBACK CONTROL LOOP BANDWIDTH AND PHASE MARGIN REGULATION

BACKGROUND OF THE INVENTION

This invention relates to feedback control loop systems. More particularly, it relates to feedback control loop systems for controlling elements which have a variable gain and frequency response and which produce an output signal proportional to the element gain and its frequency response.

In most feedback control loop systems, the basic problem to be solved is simply that of generating and feeding back an error correction signal whose parameters are essentially independent of any effects of gain or frequency response by the element to be controlled. In such a situation the gain and frequency response to be applied to the error correction signal remains at all times substantially constant, regardless of the output of the controlled element, since the controlled element has no impact upon the bandwidth of the feedback control loop. Conversely, in a conventional automatic gain control circuit the problem addressed is that of amplifying or attenuating a signal utilized in an open-loop control system. In that situation the applied gain is utilized for stabilization of another parameter of operation of the controlled element which does not itself affect the applied gain or frequency response.

As an example of servo control systems illustrating the closest-known current understanding of the adaptive control problem, reference is made to an article by Richard L. Melton of Industrial Drives, A Kollmorgen Company, entitled "Real-Time Adaptive Velocity Control," appearing in *Powerconversion & Intelligent Motion*, Volume 12, No. 5, May 1986, page 40-44. This article is based in part on the Technical Report TR-85-CO2, "Real-Time Adaptive Control," March 1985, by Wayne T. Culberson, Research Scientist, Kollmorgen Corporation, Industrial Drives Division. The article teaches of the need for optimum servo compensation over a wide range of load parameter variations. However, the article fails to recognize the existence or possibility of a critical low-frequency pole shift in the disclosed design which moves concurrently with a zero of interest. Moreover, a critical analysis reveals that hardware disclosed in Appendix C and Appendix D of the article do not correspond to the block diagram shown in FIG. 3 of the article. Furthermore, the block diagram of FIG. 3 cannot be realized in practice because of the missing pole at the block labeled KI/S. Consequently, the teachings of the article are inadequate for a solution of the problem addressed.

Heretofore, except for U.S. Pat. No. 4,092,530 to the present inventor, it has not been deemed necessary to address the compound problem of a second-order stabilization in which it is necessary to stabilize the loop gain and frequency response of the system stabilizing feedback loop, wherein the controlled element itself causes variations in the loop gain and frequency response and in which the operating parameters of the controlled element thus affect the gain and bandwidth of the feedback control system. In such a compound feedback control system, it is necessary to stabilize simultaneously the feedback loop gain, bandwidth and phase margin to compensate for variations in the gain and frequency response of the controlled element in order to suppress noise and potential system oscillation and stabilize the operating parameters of interest, such as output frequency, output signal level, and feedback control loop bandwidth and phase margin.

One such variable gain and frequency response element for which compounded feedback control is desirable is an electromechanical actuator (such as a DC- or AC-driven motor or thruster) whose higher-frequency gain and frequency response is inverse to loading inertia related directly to the actuator, with or without gearing. Most succinctly, the inertia, or mechanical "pole", $P_J$, which is inverse to directly relate loading inertia to the actuator, if variable because of loading inertia changes, will cause proportional changes in feedback-controlled loop bandwidth and phase margin in which it is a dominant, or controlling, factor.

To illustrate the stabilization problem more specifically, reference is made to FIG. 1 which shows that the loop-bandwidth affects the changes in loading inertia (and, therefore, pole $P_J$) related to the actuator have on a typical actuator feedback control loop. The example given illustrates two-to-one variation in loading inertia, as manifest by displacement of the pole $P_J$. Variation in loading inertia may occur upon the change of a weight of controlled arm of an actuator. This causes a similar two-to-one variation in the loop bandwidth and, therefore, step-response time and following error, or FE, (if rate-stabilized). If this is not compensated for, these changes could be totally unacceptable in the context of overall system performance. But loading inertia and $P_J$ variations of over 100 times-to-nominal occur and should be accommodated from the viewpoint of a system user; this is what has brought about this invention.

SUMMARY OF THE INVENTION

According to the invention, a method and apparatus are provided for automatically stabilizing the total loop gain, bandwidth and phase margin of a feedback control loop system. The method and apparatus provide control via a compensating control loop of a compensating element having variable gain and frequency response to produce an output signal inversely proportional to loading and frequency response of a controlled element (load) controlled by a principal feedback control loop. Stated in the terminology of servo controls, a compensating feedback control loop provides an automatic frequency-tracking zero, $Z_V$, versus an independently variable load pole, $P_J$, within the forward path of the principal feedback control loop in common with the compensating feedback control loop such that $Z_V$ "cancels" $P_J$ wherever it is within the design frequency range of operation. Both the principal feedback control loop and the compensating feedback control loop exhibit regulated gain and regulated bandwidth, so that the principal feedback control loop possesses regulated dynamic and static performance.

In accordance with the present invention, a feedback control loop system is disclosed for controlling a compensating element which includes means for generating a compensating feedback signal corresponding to the difference between a desired value of an element operating parameter and a measured value of the operating parameter in the controlled-element output signal, and means for compensating a principal feedback signal for variations in the controlled element gain and frequency response. The compensating feedback signal generating means includes means for injecting into the principal feedback loop a relatively low-level synchronously detectable signal at a frequency near the controllable bandwidth of the principal feedback signal, means for synchronously detecting the injected signal to produce a variable DC signal indicating magnitude and direction of the movement of the pole $P_J$, and means for comparing the variable DC signal with a fixed DC reference signal for developing a compensating error signal. The feedback compensating means comprises programmed means responsive to the compensating error signal to control a variable zero $Z_V$ in an inverting feedforward network of an operational amplifier. In the preferred embodiment, the operational amplifier is a differential amplifier with an inverting output and controlled frequency response and gain characteristics. The differential amplifier receives as an input the principal feedback control signal mixed with a principal command signal to produce a principal error signal, and the programmed means comprises voltage controlled resistors or switchable resistors in a network programmed to change the time constant and gain of the operational amplifier at the frequency of the injected signal. In an alternative embodiment, the feedback compensation means comprises programmed means responsive to the compensating error signal as for example generated by a digital zero-algorithm in a computer and signal path located following a digital differencing up-down counter provided for feedback subtraction from a command input.

By means of this method and apparatus, the total loop gain, bandwidth, and phase margin of the principal feedback control loop, as well as all other feedback control loops subsequently placed in the system may be stabilized, or regulated, despite variations in the gain and frequency response of the controlled element or load, thus providing controlled loop gain-bandwidth-phase margin regulation over the design-allowable frequency range of the variable load pole $P_J$, as described hereinbelow.

BRIEF DESCRIPTION OF THE DRAWINGS

FIG. 1 shows in three parts A, B and C three log-magnitude versus log-frequency plots of closed-loop gain versus changes in the independently-variable loop inertia pole, $P_J$ from its nominal value (Part A), to half the nominal frequency (Part B), and to twice the nominal frequency (Part C). (For clarity, the higher-frequency poles, i.e., higher than the bandwidth $F_{BW}{}^{MAX}$, are not shown).

FIG. 2 is a block diagram of a typical prior art velocity motion control system.

FIG. 3 is a block diagram of a velocity motion control system in accordance with one digital embodiment of the invention.

FIG. 4 is a block diagram of a velocity motion control system in accordance with one analog embodiment of the invention.

FIG. 5 is a partial detailing of the control of an exemplary programming resistor $R_{PRO}$ as employed in the embodiment of FIG. 3.

REVIEW OF SERVO CONTROL THEORY AND OPERATION

Much of the understanding of the invention depends upon a correct understanding of servo control theory and correct and thorough analyses of actual servo control systems. Therefore, in order to provide a uniform basis for understanding the underlying concept of the invention, it is helpful to consider the following tutorial about servo control theory.

Following Error, FE. Following Error is used by a number of Computer Numerical Control devices (CNCs) to command and regulate Axis Speed. In the simpler static case.

$$FE = \text{Speed} \times (2\pi \times \text{Bandwidth})^{-1},$$

where FE is in Counts, if Speed is in Counts per second. This relationship is important for two totally different reasons:

(1) For Axis Speed based on FE, any change in Bandwidth causes a Commanded Speed error; and (2) Should the capacity of a digital Counts Register for the FE be relatively low, then if the Count capacity is exceeded, either by excess Commanded Speed or by too-low Bandwidth or both, then a CNC Fault Condition will result, ending Axis control and operation, even though no true "fault" as such exists.

Poles and Zeros.
Definitions:

Pole-a discontinuity (a point of infinity) in a complex frequency plane manifest by a break frequency in a frequency-amplitude diagram where the asymptote of the signal transmission response toward higher frequency decreases by 6 dB per octave relative to a symptotes of the signal transmission response below the break point.

Zero-a null (a point of zero) in a complex frequency plane manifest by a break frequency in a frequency-amplitude diagram where the asymptote of the signal transmission response toward higher frequency increases by 6 dB per octave relative to asymptotes of the signal transmission response below the break point.

An example of the coding used for poles is as follows:

$$<P_X> = (1 + jf/P_X) = [1 + (f/P_X)^2]^{0.5} \text{ at } a\tan(f/P_X).$$
$$\text{—Magnitude—} \quad \text{—Phase—}.$$

An example of the coding used for zeros is as follows:

$$<Z_Y> = <1 + jf/Z_Y> = [1 + (f/Z_Y)^2]^{0.5} \text{ at } a\tan(f/Z_Y).$$
$$\text{—Magnitude—} \quad \text{—Phase—}$$

For example, the signal characteristic in magnitude and phase, T(f) at 5 Hz of a network having two poles and one zero is as follows:

$$T(f) = \frac{<0.5 \text{ Hz}>}{<5 \text{ mHz}><20 \text{ Hz}>} = 0.008,989$$

at $-19.690°$ phase,
where zero magnitude(s) multiply and pole magnitudes divide, and zero phase(s) add(s) and pole phase(s) subtract(s).

A 45-plus pole-and-zero equation can, therefore, be easily evaluated for both magnitude and phase at any given frequency. Arranging poles and zeros in equations from left to right shown in $<Z_Y>$ and $<P_X>$ form from lowest-to-highest frequencies, as shown above, allows convenient assessment of a servo system.

Frequency Domain to Time Domain Conversion. Since it is much easier to design closed-loop systems in the frequency domain, yet far easier to proof-test both hardware and software in the time domain, the following two headings rigorously "connect" frequency and time domains so that performance design predictions can be precisely made and then precisely test-confirmed.

(1) For a Step-Command Input (or square-wave), closed-loop:

$$\text{Bandwidth, } F_{BW} = \frac{(350 \text{ Hz} \cdot \text{milliseconds})}{\text{C-L Output Rise/Fall Time}}$$

where rise/fall time is measured from 10% to 90% levels and where the electrical EE terms and mechanical ME terms are much less than the closed-loop C-L term in the following more precise equation:

$$T^{rise}_{fall} = \text{(in msec)}$$

$$\left[ \underbrace{(t_{ME},\text{msec})^2}_{ME} + \underbrace{\left(\frac{350 \text{ Hz-msec}}{F_{EE},\text{Hz}}\right)^2}_{EE} + \underbrace{\left(\frac{350 \text{ Hz-msec}}{F_{BW},\text{Hz}}\right)^2}_{C-L} \right]^{0.5}$$

$$\text{where } t_{ME} = \frac{(1000X)(\text{Speed-change,rad/sec})}{acc_{max},\text{rad/sec}^2}$$

where the maximum acceleration attainable is:

$$acc_{max} = (K_{To}I_{max} - [T_F + T_{load}] - K_DW) \cdot (J_R + J_{load})^{-1}$$

where these terms are defined hereinbelow.

(2) For a step-command input (or square-wave), closed-loop, the governing phase margin and damping ratio directly relate to the step-response overshoot, SRO, of the C-L output according to the following TABLE I:

TABLE I

| (o) Phase Margin | vs | (X) Damping Ratio | & | (%) Step-Response Overshoot |
|---|---|---|---|---|
| +45 | | 0.4204 | | 23.32 |
| 50 | | .4777 | | 18.12 |
| 54 | | .5276 | | 14.21 |
| 58 | | .5825 | | 10.53 |
| 62 | | .6443 | | 7.088 |
| 66 | | .7162 | | 3.979 |
| 70 | | .8034 | | 1.443 |
| 72 | | .8554 | | 0.558 |
| +74 | | 0.9155 | | 0.079 |

Commentary on (1) and (2) above.

Statements (1) and (2) are exactly correct for first- and second-order closed-loop systems only. However, every closed-loop system showing step-response overshoot of less than about 18% behaves like a second-order system—even if it contains 45 or more poles and zeros. Therefore, the closed-loop bandwidth, and the regulation thereof according to the invention, can always be easily checked by measuring the rise-times and fall-times of the closed-loop output in response to an appropriate input square wave drive. Test of the step-response overshoot, SRO, checks the phase margin of the closed loop.

Loop stabilization versus loop type and number of loops:

Single feedback control loops.

Two poles and one zero $<P_V>$, $<Z_V>$, and $<P_{FO}>$, are illustrated below. This system can be implemented in either hardware or software. In lower-performance loops or where $<P_J>$ is much lower in frequency than the nominal loop bandwidth $F_{BW}$, then the pole $<P_V>$ and the zero $<Z_V>$ are sometimes omitted.

The "type" number of a control loop, which is zero, 1 or 2, is also the exponent of the Laplacian operator s, where $$s = jw \text{ or } j2\pi f.$$

The operator s is a part of the denominator of the non-frequency-dependent gain term. It is also a multiplier of minus ninety degrees, which deducts directly from phase margin.

a. For Type Zero control loops (such as a velocity loop, FIGS. 1 and 2), the gain $GH_{VEL}$ is given by:

$$-GH_{VEL} = K^0_{DC}/s^0 \left[ \frac{<Z_V>}{<P_V><P_J><P_{EE}><P_{FO}><P_{DR}><P_{HI}>} \right]$$

where, for $<Z_V> = <P_J>$, $$F_{BW}^{VEL} \approx (Kdc_o) \times (P_v),$$

where $F_{BW}^{VEL} \leq (P_{EE} \text{ or } P_{FO})/2$, such that:

$$\text{PhaseMargin}_{VEL} = 180° - 90° \cdot <0> - a \tan (F_{BW}/P_V) - \text{SUM}(a \tan (F_{BW}/P_X)).$$

Usually PhaseMargin$_{VEL} \geq +58°$, and, therefore, usually Overshoot $\leq 10.5\%$.

In real systems of Type Zero, the term $<P_{EE}>$ is an electrical pole; the term $<P_{FO}>$ is the dominant loop filter pole; the term $<P_{DR}>$ is the pole determining the power amplifier loop bandwidth, $F_{BW}^{PA}$; and $<P_{HI}>$ is the hardware-high-frequency pole, which is the gain-bandwidth of the amplifier divided by the high-frequency gain.

The Type Zero loop is a very easy loop to stabilize and very easy to obtain relatively high performance.

(b) Type 1 (such as a typical actuator-driven motion control position loop):

$$-GH_{POS} = \frac{K^1_{DC}}{s^1 = j2\pi f}$$

$$\left[ \frac{<Z_V><Z_C>}{<P_V><P_J><P_{EE}><P_{FO}><P_C><P_{I-DR}><P_{HI}>} \right]$$

where, for $<Z_V> = <P_J>$, $$F_{BW}^{POS} = (ABS)GH \underset{@s=1}{\left(\frac{1 \text{ Hz}}{2\pi}\right)^2} (Z_C)^{-1},$$

for $(4X) < Z_C > \leq F_{BW}^{POS} \leq (<P_{EE}> \text{ or } <P_{FO}> \text{ or } <P_C>/4X$ so $$\text{PhaseMargin}^{POS} = 180° - 90°(1) - a \tan (F_{BW}/P_V) + a \tan(F_{BW}/Z_C) - \text{SUM}a \tan (F_{BW}/P_X),$$

usually PhaseMargin$^{POS} \geq +58°$, and, therefore, Overshoot is usually $\leq 10.5\%$.

The term $<Z_C>$ is an added loop-compensation zero (hardware or software) and the term $<P_C>$ is the required high-frequency pole of $<Z_C>$, which is required for hardware and usually software implementation). (Other high-frequency poles are as in a Type Zero system above.)

The Type 1 loop usually requires considerable care to stabilize, especially to obtain relatively high performance (i.e., high bandwidth, high phase margin and low overshoot), since it has lost 90° of operating phase margin relative to Type 0 Loops prior to adding phase compensation, $<Z_C>$.

(c) Type 2 (such as closely-approximated by a very high inertia load antenna positioning drive, where the high inertia pole $<P_J>$ goes to near zero, i.e., to μHz):

$$-GH_{POS} = (ACCEL)$$

$$\frac{K_{DC}^2}{s^2 = (j2\pi f)^2} \left[ \frac{<Z_C>}{<P_{EE}><P_{FO}><P_C><P_{DR}><P_{HI}>} \right]$$

where $<P_V>$ and $<Z_V>$ ARE NOT ALLOWED at frequencies greater than $P_J$, or limit-cycling will occur after a drive command goes to zero in a system without dithering; however such terms are allowed with dithering, such as used in accordance with the invention).

One of the conditions of proper operation is that the bandwidth should be four times removed from the zero $<Z_C>$ and four times removed from the nearest pole $<P_{EE}>$, $<P_{FO}>$ or $<P_C>$, that is:

$$(4X)<Z_C> \leq F_{BW}{}^{POS}{}_{(ACCEL)} \leq (P_{EE}, P_{FO}, \text{ or } P_C)/4X.$$

Thus, $$\text{PhaseMargin}^{POS}{}_{(ACCEL)} = 180° - 90°(2) + a \tan (F_{BW}/Z_C) - \text{SUM}\, a \tan (F_{BW}/P_X)$$

Usually, PhaseMargin$^{POS}{}_{(ACCEL)} \leq +58°$, and, therefore, overshoot is usually $\leq 10.5\%$ and $<Z_C>$ and $<P_C>$ are the same as in a Type 1 system as shown above.

The Type 2 loop requires the most care of any loop to stabilize, especially to obtain relatively high performance, since it has lost all 180° of operating phase margin relative to a comparable Type Zero loop prior to adding phase compensation, $<Z_C>$. The invention as disclosed hereinbelow is nevertheless still operative under conditions of changing load inertia.

Referring now to FIG. 2, there is shown a block diagram of a typical prior art velocity motion control system 10 with sample values. A conventional inverting input high gain differential amplifier 8 operative as an error sensing operational amplifier is provided with a feedforward network 50 to introduce a variable zero $<Z_V>$ and a dominant fixed pole $<P_V>$ in an error amplifier subsystem 21 formed by a forward impedance scaling element ($R_{FWD}$) 13, a variable impedance scaling element ($R_L$) 12, and a capacitor 11. The capacitor 11 in conjunction with the impedance scaling element 12 is for incrementally setting the variable zero $<Z_V>$. The capacitor 11, together with the very high impedance resistance $R_{FWD}$ 13 introduces the required constant low frequency pole $<P_V>$. The output of the amplifier subsystem 21 is coupled to a power amplifier 6 which in turn is coupled to an actuator 2, or motion controller, which in turn is coupled to drive a load 4 and a velocity sensor 18. The velocity sensor 18 is in a feedback loop and is coupled to a feedback scaling element 16 which in turn is coupled to a zero-seeking summing junction 17 or its equivalent. The summing junction 17 is also coupled to receive a control signal $E_C$ attenuated by a drive scaling element ($R_C$) 14. The forward impedance of the error amplifier 19 comprises the combination of the effects of forward impedance scaling element 13 in parallel with series-coupled zero-setting scaling element 12 and integrator 11. In an analog hardware implementation, the scaling elements 12, 13, 14 and 16 are fixed resistances. In a digitally implemented realization or in software, the scaling elements may be counters or division functions (all of which are conventional).

The error amplifier 8 provides a high frequency pole $P_{HI}$, the dominant pole $P_V$ and the compensating zero $Z_V$. The complete transfer function of the error amplifier 8 with its associated feedback elements 11, 12, 13, and 14 in a conventional hardware implementation as referenced to the input command $E_C$ is given by:

$$\frac{V_E}{E_C} = \left( \frac{-R_{FWD}^D}{R_C} \right) \left[ \frac{<Z_V>}{<P_V><P_{HI}>} \right]$$

As an example:

$$= \left( \frac{-24.9\, \text{M}\Omega}{2.49\, \text{k}\Omega} \right) \left[ \frac{<84.1\, \text{milliHz(NOM)}>}{<543\, \mu\text{Hz}><46.3\, \text{kHz(NOM)}>} \right]$$

$$= -10,000X \left[ \frac{<84.1\, \text{milliHz(NOM)}>}{<543\, \mu\text{Hz}><46.3\, \text{kHz(NOM)}>} \right].$$

In an example where the feedback scaling element $R_V$ 16 is set equal to the drive scaling element $R_C$ 14, then:

$$V_E/E_{VEL} = V_E/E_C.$$

If in an analog hardware implementation, the forward impedance scaling element 13 is very much greater in value than the zero-setting scaling element 12, that is $$R_{FWD}{}^D >> R_L{}^{MAX};$$

if the fixed dominant pole $P_V$ is set to a defined value which is equal to the bandwidth divided by the DC loop gain $GH_{DC}$, that is, $$P_V = F_{BW}/GH_{DC} = (2\pi \times R_{FWD}{}^D \times C1)^{-1};$$

and if the correction zero $Z_V$ is set to another defined value which is equal to the nominal inertia pole $P_J$, that is, $$Z_V = P_J = (2\pi \times R_L \times C1)^{<1};$$

then the high frequency pole $P_{HI}$ is simply the gain-bandwidth of the differential amplifier 8 divided by the high-frequency gain of the feedback transfer function, $V_E/E_{VEL}$, that is:

$P_{HI}$ = (Open-Loop
Gain × $BW$)/{$(R_{FWD}{}^D/R_V)(P_V/Z_V)$}{, since $V_E/E_{VEL} = (R_{FWD}{}^D/R_V)(P_V/Z_V)$. The value of the zero-setting scaling element $R_L$ will be significant in the embodiments according to the invention, as explained hereinafter.

The power amplifier 6 usually comprises a subsystem providing at least two poles within its operational bandwidth, namely, the electrical pole $P_{EE}$ associated with loop inductance and resistance, and the drive pole $P_{DR}$ associated with the bandwidth of the power amplifier (which usually is quite high relative to the bandwidth of interest). In this example, the power amplifier is a supplier of current output $I_A$ in response to an input voltage $V_E$ and thus has a transfer function as follows, with exemplary values:

$$\frac{I_A}{V_E} = (+K_I)\left[\frac{1}{<P_{EE}><P_{DR}>}\right] =$$

$$\left(\frac{7.5A}{10V}\right)\left[\frac{1}{<91\ Hz><1.5\ kHz>}\right]$$

where $$P_{EE} = \frac{C1(R_{rotor} + R_{drive} + R_{wiring})}{2\pi(L_{rotor} + L_{wiring})} = 91\ Hz$$

The constant C1 is a multiplying constant, a function of the type of power amplifier 6 and actuator 2 employed.

The pole $<P_{DR}>$ is the pole at the zero dB response of the control loop of the power amplifier.

The constant $K_I$ is the voltage to current conversion constant of the power amplifier 6.

The actuator 2 in the present example may be a current to motion converter, such as a rotary or linear motor or a thruster, driven by AC power, DC power or fluidic power. The generalized transfer function of the actuator 2 with a specific example is given by:

$$\frac{\omega}{I_A} = \left(\frac{+K_{TO}}{K_D}\right)\left[\frac{(1-\epsilon)}{<P_J>}\right]$$

$$= \left(\frac{180\ lb\text{-}ft/7.5A}{24.5\ lb\text{-}ft/2\pi\ rad/s}\right)\left[\frac{(1-\epsilon)}{<84.1\ mHz_{NOM}>}\right]$$

$$= 6.155\ (in\ rad/A\text{-}s)\left[\frac{1}{<84.1\ mHz_{NOM}>}\right]$$

where:
$\omega$ in this example is output rotary speed in rad/s (varying between zero and $\pm 2\pi$, $\omega = S \cdot \theta$);
$I_A$ is the drive current of the actuator 2, in Amperes;
$K_{TO}$ is the torque constant of the actuator 2, in lb-ft/A;
$K_D$ is the viscous torque constant of the actuator 2, in lb-ft/rad/s;
the mechanical pole $<P_J>$, with the terms used in the example, has a nominal value of 84.1 milliHz and is given by the expression:

$$<P_J> = \frac{K_D}{(C2)\ 2\pi(J_{rotor} + J_{load})}$$

where:
C2 is a multiplying constant, a function of the power amplifier and actuator employed;
$J_{rotor}$ is the inertia of the actuator 2, in lb-ft-s$^2$, which in this example is 0.738;
$J_{load}$ is the inertia of the load 4 as coupled directly to the moving element of the actuator, in lb-ft-s$^2$, which in this example is 6.64$_{NOM}$ (as hereinafter explained the pole must be compensated for according to the invention); and
where $\epsilon$ is the torque-loading "stiction" ratio given by the expression:

$$\epsilon = \left(\frac{[T_{friction} + T_{load}]<P_{EE}>}{(K_{TO})\ (K_I)\ [R_{FWD}^D/R_C][<Z_V>/<P_V>]\ (E_C)}\right)$$

where $T_{friction}$ is the friction torque in lb-ft, which in this example is 5.4 lb-ft.

The value of $\epsilon$ varies between zero and 0.003 in this example.

The load 4 is manifest in two terms, $T_{load}$, torque in lb-ft, which in this example is zero, and $J_{load}$, inertia in lb-ft-s$^2$, which is nominally 6.64.

The velocity sensor 18 provides an output voltage in response to input motion. In the example here, the motion is rotary and is given by the expression:

$$\frac{E_{VEL}}{\omega} = +\frac{K_{Ta}}{<P_{FO}>} = +\left(\frac{10V}{2\pi\ rad/s}\right)\left[\frac{1}{<234Hz>}\right]$$

where:
$K_{Ta}$ is the speed-to-voltage conversion constant of the sensor 18; and
$<P_{FO}>$ is the pole of a lowpass filter to suppress out-of-band noise, spikes and undesired pickup on the output voltage signal of the sensor 18.

Therefore in summary, the plant transmission of the elements 6, 2 and 18, i.e., $E_{VEL}/V_E$, is given by:

$E_{VEL}/V_E =$ $$+(7.347)\left[\frac{(1-\epsilon)}{\underset{P_J^{NOM}}{<84.1mHz>}\ \underset{P_{EE}}{<91Hz>}\ \underset{P_{FO}}{<234Hz>}\ \underset{P_{DR}}{<1.5kHz>}}\right].$$

Finally, the loop gain equation for the feedback loop of FIG. 2, with sample values, is given by:

$$GH_{VEL} = (G_{VEL}^{DIFF})(G_{PWR\ AMP})(G_{ACTUATOR})(G_{SENSOR}) =$$

$$-\left(\frac{R_{FWD}^D}{R_V}\right)(K_I)\left(\frac{K_{TO}}{K_D}\right)(K_{Ta})\left[\frac{<Z_V>}{<P_V><P_J><P_{EE}><P_{FO}><P_{DR}><P_{HI}>}\right]$$

$$\underbrace{\phantom{XXXXXXXX}}_{GH_{DC}}$$

For the sample values given, $$GH_{VEL} = -73,470 \times \left[ \frac{<84.1m^{NOM}>}{\underset{P_V}{<543u>} \; \underset{P_J}{<84.1m^{NOM}>} \underset{P_{EE}}{<91>} \underset{P_{FO}}{<234>} \underset{P_{DR}}{<1.5k>} \underset{P_{HI}}{<46.3K>}} \right]$$

A system designed in the frequency domain with the following values:
$F_{BW}{}^{VEL} = 36.47$ Hz$_{NOM}$ at PhaseMargin$= +57.864°$-$_{NOM}$. will exhibit the following respective parameters in the time domain:

$$T^{Rise}{}_{Fall} = 9.60 \text{ msec}_{NOM};$$

Step response overshoot or SRO$=10.65\%$.

DESCRIPTION OF SPECIFIC EMBODIMENTS

Referring to FIGS. 3 and 5 there are shown implementations of a first preferred embodiment according to the invention.

Referring now to FIG. 3, there is shown a block diagram of a velocity motion control system 100. A conventional inverting input high gain differential amplifier 8 operative as an automatically compensating error amplifier 21' is coupled to power amplifier 6 which in turn is coupled to actuator 2, or motion controller, which in turn is coupled to drive load 4 and velocity sensor 18. The velocity sensor 18 is in a feedback loop and is coupled to a feedback scaling element 16 which in turn is coupled to a zero-seeking summing junction 17 or its equivalent. The summing junction 17 is also coupled to receive a control signal $E_C$ attenuated by a drive scaling element ($R_C$) 14. The forward impedance of the error amplifier 21 comprises the combined effects of a forward impedance scaling element ($R_{FWD}$) 13 in parallel with a series-coupled controlled zero-setting scaling element ($R_{PRO}$) 12' and integrator (C1) 11. In an analog hardware implementation, the scaling elements 12', 13, 14 and 16 are fixed resistances. In a digitally implemented realization or in software, the scaling elements may be counters or division functions.

The error amplifier 21' elements provide a high frequency pole $P_{HI}$, a fixed dominant pole $P_V$ and the compensating zero $Z_V$. The differential amplifier 8, which is typically a high-gain operational amplifier, is operative to invert input signals applied at an input summing means 17 whose output is provided to the input of the differential amplifier 8.

According to the invention, the differential amplifier 8 is provided with a controlled element 50 operative to produce an automatic frequency-tracking (and gain-tracking) zero $<Z_V>$ and a fixed dominant low-frequency pole $<P_V>$. The transfer function in the principal feedback control loop of the differential amplifier 8, ignoring command and compensation inputs, is given by:

$$\frac{V_E}{E_{VEL}} = \left( \frac{-R_{FWD}^D}{R_V} \right) \left[ \frac{<Z_V>}{<P_V> \; <P_{HI}>} \right]$$

Command signals are applied to the control system 100 at a command input 110 in the form of a (voltage) control signal $E_C$ through first scaling element (resistor $R_C$) 14 to the summing means 17. According to the invention, a synchronously-detectable signal $E_{SD}$ is injected via second scaling element ($R_{SD}$) to the summing junction 17 at a signal level which is relatively low compared to other signals at the summing junction and at a set frequency near the preset closed-loop bandwidth of the principal feedback control loop.

The power amplifier 6, the actuator 2, the load 4 and the velocity sensor 18 have the characteristics and transfer functions as described hereinabove and therefore no further explanation is necessary.

According to the invention, there is provided a controlling feedback control loop comprising a regulated oscillator 20 for generating a synchronously detectable signal $E_{SD}$ at a frequency $F_{SD}$, which signal is coupled to a fixed phase shifter 26 as well as to a signal scaling element ($R_{SD}$) 24 (via a first optional voltage blocking capacitor ($C_{BLK1}$) 22). The output signal of the fixed phase shifter 26, designated E1, is coupled to one signal input 30B of a synchronous detector (with an output lowpass filter) 30. The output of the velocity sensor 18, namely, signal $E_{VEL}$ (without regard to linear scaling) is also coupled (via an optional second blocking capacitor ($C_{BLK2}$) 28) to a second signal input 30B of the synchronous detector 30. The synchronous detector 30 is operative to provide as an output signal a varying DC voltage E2 whose level is proportional to the degree of phase synchronism between the signals applied at the inputs 30A and 30B and the combined magnitude of the signals, which is a function of the value of $R_{PRO}$ and $<P_J>$.

The varying DC voltage E2 is provided to one input 32A of a level shifter and low-frequency gain amplifier 32. A reference DC voltage $E_{REF}$ is provided to amplifier 32 at a second input 32B. Amplifier 32 shifts and scales the varying DC voltage E2 relative to $E_{REF}$ to condition it as a signal E4 to drive an analog to digital converter (ADC) 34. The ADC 34 is for example an eight-bit analog voltage to digital octal-value converter whose output is applied to an eight-conductor bus 35. The ADC 34 produces a correction signal ranging from zero (at E4 equal to zero volts) to $2^N$ (where N is the digital resolution) at for example E4 equal to ten volts. The signal on bus 35 is provided to the programmed scaling element 12', which is preferably a switched resistor network of the type shown in FIG. 5.

Referring to FIG. 5, a switched resistor ladder 12' is shown. It comprises a plurality of resistors R1,R2,R3, . . . RN having one terminal coupled in common to an output port 114 (which is coupled to the input of amplifier 8 of FIG. 2 or 3), and the other terminal of each resistor R1, . . . RN coupled to one terminal of respective single-pole switches S1,S2,S3, . . . SN. The other terminal of each of the switches S1,S2,S3, . . . SN is coupled to a common node 116, which in turn is coupled to the integrator (C1) 11. The values of the resistors are programmed so that the combined parallel combination at each binary switch setting adjusts the zero $<Z_V>$ to track the mechanical pole $<P_J>$, thereby cancelling the frequency response effects of that pole over substantially the entire useful operating range of the control system. The values for an exemplary system are given below.

Referring to FIG. 4, there is shown an alternative embodiment 100' of the control system of FIG. 3. All of the elements are substantially identical, except as follows: In the control system 100', the output voltage E4 of the gain amplifier 32 is provided directly to the controlled element 12'', which in this embodiment is an analog voltage controlled resistance means (VCR) 12''. A simple example is a high-input-impedance field effect transistor (FET) controlled by a voltage signal at its gate terminal G. A conventional bias network (not shown) may be provided to the FET to assure operation in its nonsaturating operating range.

By thus controlling the zero $<Z_V>$ in the error amplifier 21'', the controlled-feedback control loop of interest has essentially a constant loop bandwidth and phase margin.

The desired ideal loop response and pole/zero placement in accordance with the invention are shown in FIG. 1, Part A. The zero $Z_V$ is placed directly in line with the pole $P_J$ in reference to the frequency. As the pole moves, the zero is moved under system control to track the frequency of the pole.

The embodiments shown in FIGS. 3 and 4 provide to the internal or controlling-feedback control loop including the velocity sensor 18 essentially a constant loop gain and bandwidth. This, in turn, provides to the controlled-feedback control loop of interest, including the synchronous detector 30 a constant static and dynamic response over the entire design frequency range of operation of the independently variable pole $P_J$.

In a system according to the invention, there are just three specifics:

(1) Regulation of the partly digital implementation (accounting for digital resolution): Given the implementation of the invention in accordance with the structure of FIGS. 3 and 5, and for easily-obtained $GH_{VEL}{}^{DC} \geq 50,000$ in the circuit of FIG. 2 and $GH_{SD}{}^{DC} \geq 1000$ in the circuit of FIG. 3, then the velocity bandwidth, $F_{BW}$, will be held at $F_{BW}{}^{NOM}$, within $\pm E\%$, for a design-accommodating Max-to-Min ratio R in $P_J$, (FIG. 1) of $$R = (1 + E/100)^{2N},$$

where N is the number of correction bits used. The various resolutions are set forth in the following table, designated TABLE II:

TABLE II

| R | vs | ± E% Velocity Bandwidth Regulation | | | | |
|---|---|---|---|---|---|---|
| | | 8-BITs | 10-BITs | 12-BITs | 14-BITs | 16-BITs |
| 2 | | 4.427 | 3.527 | 2.930 | 2.506 | 2.190 |
| 5 | | 10.58 | 8.380 | 6.936 | 5.916 | 5.158 |
| 7 | | 12.93 | 10.22 | 8.446 | 7.197 | 6.270 |
| 10 | | 15.48 | 12.20 | 10.07 | 8.571 | 7.461 |
| 14 | | 17.93 | 14.11 | 11.62 | 9.884 | 8.597 |
| 20 | | 20.59 | 16.16 | 13.30 | 11.29 | 9.814 |
| 50 | | 27.70 | 21.60 | 17.70 | 15.00 | 13.00 |
| 100 | | 33.35 | 25.89 | 21.15 | 17.88 | 15.48 |
| 200 | | 39.26 | 30.33 | 24.70 | 20.83 | 18.01 |
| Regulation factor: | | | | | | |
| @ 2 | | 31.95X | 40.10X | 48.27X | 56.43X | 64.58X |
| @ 20 | | 21.72X | 27.67X | 33.63X | 39.61X | 45.57X |

TABLE II-continued

| R | vs | ± E% Velocity Bandwidth Regulation | | | | |
|---|---|---|---|---|---|---|
| | | 8-BITs | 10-BITs | 12-BITs | 14-BITs | 16-BITs |
| @ 200 | | 36.02X | 46.63X | 57.26X | 67.89X | 78.52X |

(2) Proximity of the carrier at the synchronously detectable frequency $F_{SD}$ to the loop bandwidth $F_{BW}$:

The choice of frequency $F_{SD}$ is a compromise relative to the bandwidth $F_{BW}$ of the controlled loop.

(a) The frequency of the synchronously detectable carrier signal should be high to minimize the rejection factor $(1 + [F_{BW}/F_{SD}]^2)^{0.5}$ of the signal of the controlled loop, and the operation of the controlling loop should be maximized by maintaining the ratio of bandwidths of $F_{SD}$-to-controlling loop at greater than about five times.

(b) The frequency of the synchronously detectable carrier signal should be low, as low as ten times the maximum frequency of the pole, $P_J{}^{MAX}$, to minimize required synchronous detection drive signal at $V_E$ to less than about 25% of $V_E{}^{MAX}$ at $P_J{}^{MIN}$ operation.

(c) The frequency of the synchronously detectable carrier signal should be close to $F_{BW}$ so that its regulation effects by the second, controlling, loop effectively transfer to the controlled loop of interest related to $F_{BW}$.

A good compromise usually is to set $F_{SD}$ equal to 75% to 95% of the setting of $F_{BW}$ for the controlled loop.

In summary, the bandwidth of the controlled loop $F_{BW}$ is effectively frequency-regulated by proximity-transfer of actual voltage-regulation of $E_{VEL}$ at the frequency $F_{SD}$ of the synchronously detectable signal $E_{SD}$. Regulation depends upon causing the "tracking zero" $Z_V$ to follow the variable pole, $P_J$. Similarly the controlled loop bandwidth $F_{BW}$ depends upon the same "tracking zero" $Z_V$.

(3) Frequency Domain Boundary Conditions.

For the above pole-tracking concept to operate without further compensation, the following conditions should be fully met:

(a) $P_J{}^{max} = Z_V{}^{max}$ to be $\leq 10\%$ of $F_{SD}$ or $F_{BW}$ of controlled loop, whichever is lower in frequency.

(b) $P_J{}^{min} = Z_V{}^{min}$ to be $\geq 10$ times the frequency of $P_V$, which is equal to $F_{BW}/GH_{DC}$.

(c) In the frequency range from the frequency of $P_V$ to approximately 1.5 times the bandwidth $F_{BW}$ of the controlled loop, no poles or zeros other than $P_J$ and $Z_V$ are allowed.

These three conditions are usually easy to meet.

Referring now to FIG. 4, the regulated oscillator 20 is shown. The regulated oscillator 20 provides the signal $+E_{SD}$ at the frequency $F_{SD}$ within about $\pm 0.5\%$ regulation from nominal of both its frequency and output signal level. Elements 22 and 28 are each blocking capacitors whose reactance is very much less than the resistance of $R_{SD}$ 24 at the frequency $F_{SD}$. Element 24 is an input scaling resistor $R_{SD}$ to differential amplifier 8. In a specific embodiment $R_{SD}$ (at $f = F_{SD}$) may be set to:

$$R_{SD} = 10X(R_V)(1 - 1/GH_{VEL})^{-1}$$
$$= \frac{24.9 k\Omega}{(ABS)(1 - j\,33/36.47)} = 18.46 k\Omega$$

Element 26 is a phase shifter. This element matches its output E1 in phase to $E_{VEL}$ at $F_{SD}$.

Element 30 is a synchronous detector and lowpass filter. Besides providing a DC gain of about 100 times, so that operating output E2 is made equal to $E_{REF}$, this element is for providing conventional synchronous detection of inputs 30A and 30B at $F_{SD}$ as well as for creating a dominant pole $P_o$ of the controlling loop. The controlling loop has a bandwidth $F_{BW} = GH_{SD}^{DC}(2X\ P_o)$. Therefore, the block transfer function:

$$\frac{E2}{E_{VEL}^{pk}} = \frac{-K_{SD}}{<P_o>} = \left(\frac{-100}{<250\mu Hz>}\right)$$
@ $F_{SD}$ The element 32 is a differential level shifter and low-frequency gain element. This block compares input E2 to $E_{REF}$ at for example +1.00 V. $E_{REF}$ then provides sufficient gain to bring synchronous detection loop gain $GH_{SD}$ to approximately 10,000 times at DC. It also incorporates a DC level-shift so that its output E4 is always positive, as required by the load. The block transfer function is given by:

$E4/(E_{REF}+E2) = -K_{LS}/<P_{HI}^{SD}> = (-19.49KX/<12.5\ Hz>)$

Element 34 is an N-bit linear-input analog-to-digital converter. This element provides an output conversion X versus linear-input voltage E4 as follows:

| BIT # | -vs- | E4, volts |
|---|---|---|
| 1 | | 0 |
| X | | $+10(X-1)(N-1)^{-1}, 1 \leq X \leq N$ |
| (N = 12) | | $(+0.9091(X-1)), (1 \leq X \leq 12)$ |

In order to understand the function of the several functions of the element 12", it necessary to first consider the loop gain $GH_{SD}$ of the controlling loop. The closed-loop gain $GH_{SD}$ of the controlling loop is given by:

$GH_{SD} =$ $(G_{r/\nu})(P_J) \dfrac{(E_{SD})(K_I)(K_{TO}/K_D)(K_{Ta})(K_{SD})(K_{LS})}{(R_{SD})(F_{SD})|(1-1/GH_{VEL})|}$ @ $F_{SD} <P_o><P_{HI}^{SD}>$ where:

$G_{r/\nu}$ is the incremental change in resistance of element 12", given as $dR_{PRO}$, divided by the incremental change in error drive voltage of element 32, given by dE4.

Using exemplary values at $G_{r/\nu} \times P_J$ equaling 5.739 k$\Omega$ $\times$ Hz/Volts:

$GH_{SD} = (5.739\ k\Omega \times Hz/\nu) \dfrac{(0.1V)(7.347)(100)(19,480)}{(18.46k\Omega)(33Hz)|1.3486|} \times$ $\left[\dfrac{1}{<250\mu Hz> <12.5Hz> <91Hz> <234Hz> <1.5kHz>}\right]$ $GH_{SD} =$ $\left[\dfrac{10003}{<250\mu Hz> <12.5Hz> <91Hz> <234Hz> <1.5kHz>}\right]$ so the controlling loop bandwidth $BW_{SD}$ is $2X(GH_{SD}^{DC})(P_o)$ or 4.90 Hz, and the phase margin is equal to +76.68 degrees;

which leads to a rise time of 71.4 msec and an overshoot SRO of zero percent, based on the calculations of TABLE I, hereinabove.

Element 12" is a programmable/controlled resistor. This element is the controlled element of this invention. It does the following:

(1) provides pole-tracking zero $<Z_V>$ (together with C1 11) versus load-caused variable pole $<P_J>$. This renders the open-loop operation illustrated in FIG. 1 Part B and FIG. 1 Part C to a closed-loop operation with a characteristic as shown in FIG. 1 Part A.

(2) provides constant $E_{VEL}$ at $F_{SD}$ when $<Z_V> = <P_J>$, thereby providing constant bandwidth $F_{BW}$ and phase margin, as illustrated in FIG. 1 Part A, by voltage regulation on the controlling feedback control loop.

(3) provides constant DC gain for controlling the gain $GH_{SD}$ of the feedback control loop, since the incremental product of the transfer functions of the elements 34, 12 and 2 is a constant, where these three terms are the only variables of consequence in $GH_{SD}$. In other words:

$V_E^{SD}/E4 = (G_{r/\nu})(P_J/F_{SD})(E_{SD}/R_{SD}) \rightarrow$ constant.

Since $R_{PRO} \times P_J$ is constant at each bit, and dE4, incrementally from bit to bit, is also constant, the value $(dR_{PRO}/dE4) \times P_J$ is constant. This observation is especially true as the number of bits increases.

(4) is consistent with the easily-met frequency-domain boundary conditions of the pole-tracking concept, listed above, and the condition producing the constant transfer function $V_E^{SD}/E4$ for function (3) immediately above. $R_{PRO}$, in context with its position in-loop and other explained parameters, provides constant static and dynamic performance of the controlling closed, which provides the desired dynamic parameter maintenance.

The values for $R_{PRO}$ are given in accordance with the following relationship:

$R_{PRO} = (1+E/100)^{2X-1}/(2\pi X P_J^{max} \times C1)$ where $P_J = P_J^{max}/(1+E/100)^{2X-1}$ and X is the specific bit number from 1 to N and N is the number of correction bits.

In a specific embodiment, $P_J^{max} = 841$ mHz; N = 12 and the range of $P_J$ is selected to be 100X, so E = 42.51% and C1 = 11.73 uF. For $1 \leq N \leq 12$, $R_{PRO} = 13.568$ k$\Omega$ $\times$ Hz/$P_J$. The following TABLE III illustrates the choice of resistors for a twelve bit A/D converter and a 100 to 1 design range of the pole $P_J$:

TABLE III

| Bit @ BIT N | vs. | (k$\Omega$) $R_{PRO}$ | (milliHz) $P_J$ |
|---|---|---|---|
| 1 | | 19.55 | 694.2 |
| 2 | | 28.69 | 473.0 |
| 3 | | 42.11 | 322.2 |
| 4 | | 61.80 | 219.5 |
| 5 | | 90.71 | 149.6 |
| 6 | | 133.1 | 101.9 |
| 7 | | 195.4 | 69.44 |
| 8 | | 286.8 | 47.31 |

TABLE III-continued

| Bit @ BIT N | vs. | (kΩ) $R_{PRO}$ | (milliHz) $P_J$ |
|---|---|---|---|
| 9 | | 420.9 | 32.23 |
| 10 | | 617.8 | 21.96 |
| 11 | | 906.8 | 14.96 |
| 12 | | 1,331 | 10.19 |

It has been found that regulating the output of the controlling loop $E_{VEL}^{SD}$ to within 0.01% of its 10 mV nominal value according to the invention provides cross regulation of the controlled loop to within the error calculated from designs using TABLE II such that the bandwidth of the controlled loop $F_{BW}^{VEL}$ is regulated within the percentage given in TABLE II of its nominal value of 36.47 Hz used in the example of the above specific embodiment of FIG. 3.

The embodiment shown in FIG. 4 is substantially identical to the embodiment shown in FIG. 3 with the deletion of the analog to digital converter 34. The programming resistor $R_{PRO}$ 12 has been changed from a digitized resistor matrix, as shown in FIG. 5, to an analog-type truly hyperbolic resistance, such as a voltage-controlled resistor or a FET (Field Effect Transistor) having a voltage vs. resistance characteristic appropiate to the application. The value $R_{PRO}^{Analog} \times P_J = (2\pi \times C1)^{-1}$, as before, is designed to be a constant. This hyperbolic resistance is the equivalent of allowing the number of bits of resolution N-BITS in the digital example of FIG. 3 go to infinity: The elimination of granularity has the immediate effect of closing the error gap, E%, of the digital approximation of finite segment-slopes fitted to the hyperbolic curve required of $R_{PRO}$ (TABLE II), so that regulation can be enhanced by more than two orders of magnitude in Bandwidth Regulation.

The transfer response of $G_{r/v}$ is identical for both the embodiment of FIG. 3 and the embodiment of FIG. 4, as are the GH and System Equations.

In summary, the invention has some of the following advantages:

The controlled feedback control loop of interest has its bandwidth $F_{BW}$ and its phase margin Om held essentially constant for large variations in the load-caused mechanical pole $P_J$ by a second controlling feedback control loop (with loop-gain $GH_{SD}$) sharing common pole tracking and providing regulation of the controlled loop bandwidth $F_{BW}^{VEL}$ and controlled loop phase margin $Om_{VEL}$ via the close proximity of the synchronously detectable frequency $F_{SD}$ to the controlled loop bandwidth $F_{BW}^{VEL}$ where $E_{VEL}^{SD}$ is closely regulated by the second, controlling, loop. This is true since:

A. The DC loop gain $GH_{VEL}^{DC}$ of the controlled loop is fixed.

B. The dominant pole $<P_V>$ of the controlled loop is fixed.

C. The frequency domain boundary conditions are easy to meet.

Although a Type 0 (Velocity) loop has been shown in FIG. 1 and discussed throughout this disclosure, the concept of regulation of bandwidth and of phase margin is equally valid for Type 1 (Position) and Type 2 (Acceleration) loops. Moreover, if the controlled loop according to the invention is stabilized, all loops added around the stabilized loop will also be stabilized. A stabilization scheme according to the invention simplifies outer-loop design and operation, since all outer loops "see" an essentially fixed mechanical pole, $<P_J>$. Of crucial importance for multi-loop systems, the pole-tracking zero $Z_V$ is in the common path with tracked variable pole $P_J$.

The foregoing description of illustrative embodiments of the method and apparatus of this invention is intended to be illustrative only, of the principles of the invention and not to be limitative thereof, especially in view of the applicability of the invention to numerous types of control systems unrelated to motion control, such as lasers, meteorology, power conditioning and the like. Accordingly, since numerous variations of the methodology and apparatus of this invention, within the scope of the invention, will readily become apparent to those skilled in the art, the scope of this invention is limited, not by the foregoing description, but solely by the claims appended hereto.

I claim:

1. A feedback control loop system for controlling an element by an element control loop, said element having a variable element frequency response defined by a primary frequency-domain pole in a complex frequency plane and produces an output signal inversely proportional to said element frequency response, said system comprising:

means for generating a feedback signal corresponding to the difference between a desired value of an element operating parameter and an actual value of the element operating parameter in said element output signal; and means defined by a primary frequency-domain zero in the complex frequency plane for compensating said feedback signal for variations in said element frequency response by applying to said feedback signal generating means a compensating signal, said compensating signal being manifest as said primary frequency-domain zero, said primary frequency-domain zero tracking said primary frequency-domain pole while maintaining as constants any other poles and zeroes in order to cancel step-response loop effect changes caused by changes in frequency of said primary frequency-domain pole, whereby the total loop gain, bandwidth, (step-response rise/fall time), and phase margin (step-response overshoot) of the element control loop are regulated.

2. A feedback control loop system for controlling an element by an element control loop, said element having a variable element frequency response and produces an output signal inversely proportional to said element frequency response, said system comprising:

means for generating a feedback signal corresponding to the difference between a desired value of an element operating parameter and an actual value of the element operating parameter in said element output signal; and means for compensating said feedback signal for variations in said element frequency response by applying to said feedback signal generating means a compensating signal which varies directly with said variations in said element frequency response, wherein said compensating means comprises:

another feedback control loop for compensating said element control loop, said another feedback control loop having a portion in common with said element control loop, said another feedback control loop comprising:

means for injecting a regulated signal for generating a frequency response corresponding to said variable element frequency response;

a compensating element for controlling frequency response of said element control loop; and means responsive to said regulated signal for applying a feedback control signal to said compensating element through the common loop portion to stabilize magnitude, phase margin and bandwidth of said another feedback control loop, and thereby to stabilize magnitude, phase margin and bandwidth of said element control loop, whereby the total loop gain, bandwidth (step-response rise/fall time), and phase margin (step-response overshoot) of the element control loop is regulated.

3. The system according to claim 2, wherein said feedback control signal applying means comprises an analog to digital converter for applying a digital signal inversely proportional to a load inertia to said compensating element and wherein said compensating element comprises an impedance scaling element for incrementally setting an electrical zero in response to said digital signal.

4. The system according to claim 3, wherein said compensating means further comprises an electrical capacitance means for providing a variable zero and as fixed low-frequency pole.

5. The system according to claim 3, wherein said impedance scaling element exhibits a scaling characteristic of a constant divided by the frequency of a variable loading pole to be compensated for.

6. The system according to claim 2, wherein said feedback control signal applying means comprises means for applying a variable analog signal which is inversely proportional to a load inertia to said compensating element and wherein said compensating element comprises an analog impedance scaling element for continuously setting an electrical zero in response to said analog signal.

7. The system according to claim 6, wherein said compensating means further comprises an electrical capacitance means for providing a variable zero and a fixed low-frequency pole.

8. The system according to claim 2, wherein the bandwidth of said element control loop is frequency-regulated by a variable zero controlled by said compensating element, said compensating element-controlled zero being made to be equal to, and thereby to track, a variable frequency loading pole of said controlled element.

9. The system according to claim 8, wherein said compensating element-controlled zero is controlled by signal level regulation of a frequency dithering signal, wherein said frequency dithering signal is synchronously detected without interfering with said element control loop.

10. The system according to claim 9, wherein said signal level regulation follows frequency regulation of a variable zero provided in said common loop portion such that loop gain of said element control loop is stabilized and regulated, and bandwidth and phase margin of said element control loop is substantially constant for a range of variations in load inertia.

11. The system according to claim 10, wherein said another feedback control loop comprises a synchronous detector coupled to recieve a first reference signal and to receive a controlled signal having embedded therein a second reference signal, said first reference signal being selectively phase shifted with respect to said second reference signal, said synchronous detector being operative to compare said first reference signal and said second reference signal to produce a variable level signal in proportion to error between said first reference signal and said second reference signal, and wherein said variable level signal is applied to said feedback control signal applying means.

12. A feedback control system for controlling an element by an element control loop, said element having a variable element frequency response and produces an output signal inversely proportional to said element frequency response, said system comprising:

means for generating a feedback signal corresponding to the difference between a desired value of an element operating parameter and an actual value of the element operating parameter in said element output signal; and means for compensating said feedback signal for variations in said element frequency response by applying to said feedback signal generating means a compensating signal which varies inversely with said variations in said element frequency response, wherein said compensating means comprises a compensating control loop, said compensating control loop comprising:

detection means for providing a frequency responsive analog error signal, including means for providing sychronous detection of injected signals, wherein a first reference signal is provided by a reference element means independent of load effects, and wherein a second reference signal is extracted from said compensating control loop after load effects, including variable pole effects;

means for providing preset high gain for said error signal;

wherein said reference element means for providing said first reference signal corresponds to a predetermined element gain;

means for providing level setting and phase adjustments for said first reference signal, said level setting and phase adjustments being load-independent; and means for applying said feedback signal to said detection means to provide a tracking zero corresponding to a load-induced variable pole of said controlled element;

whereby the total loop gain, bandwidth (step-response rise/fall time), and phase margin (step-response overshoot) of the element control loop is regulated.

13. A method for controlling the operation of an element by an element control loop, said element having a variable element frequency response defined by a primary frequency-domain pole in a complex frequency plane and produces an output signal inversely proportional to said element frequency response, said method comprising the steps of:

generating a feedback signal corresponding to the difference between a desired value of an element operating parameter and an actual value of the element operating parameter in said element output signal; and applying to means generating said feedback signal a compensating signal defined by a primary frequency-domain zero in the complex frequency plane, said compensating signal being manifest as said primary frequency-domain zero, said primary frequency-domain zero tracking said primary frequency-domain pole while maintaining as constants any other poles and zeroes in order to cancel frequency response effects of said primary frequency-domain pole and to compensate for variations in said element frequency response for compensating said feedback signal for variations in said element frequency response, whereby the total loop gain, bandwidth (step-response rise/fall time), and phase margin (step-response overshoot) of the element control loop is regulated.

14. A method for controlling the operation of an element by an element control loop, said element having a variable element frequency response and produces an output signal inversely proportional to said variable element frequency response, said method comprising the steps of:
generating a feedback signal corresponding to the difference between a desired value of an element operating parameter and an actual value of the element operating parameter in said element output signal; and
applying to means generating said feedback signal a compensating signal by means of another feedback control loop, said another feedback control loop having a portion in common with said element control loop, said applying step comprising:
injecting a regulated signal for generating a frequency response corresponding to said variable element frequency response;
controlling a compensating element for controlling frequency response of said element control loop; and
applying a feedback control signal to said compensating element through the common loop portion responsive to said regulated signal to stabilize magnitude, phase margin and bandwidth of said another feedback control loop, and thereby to stabilize magnitude, phase margin and bandwidth of said element control loop,
whereby the total loop gain, bandwidth (step-response rise/fall time), and phase margin (step-response overshoot) of the element control loop are regulated.

15. The method of claim 14 wherein said compensating signal is obtained by applying a digital signal inversely proportional to a load inertia to said compensating element and wherein said compensating signal applying step further comprises incrementally impedance scaling for incrementally setting an electrical zero in response to said digital signal.

16. The method according to claim 14, wherein said feedback control signal applying step comprises applying a variable analog signal which is inversely proportional to a load inertia to said compensating element and wherein said compensating signal applying step further comprises analog impedance scaling for continuously setting an electrical zero in response to said analog signal.

17. The method according to claim 14, wherein the bandwidth of said element control loop is frequency-regulated by a variable zero controlled by said compensating element, said compensating element-controlled zero being made to be equal to, and thereby to track, a variable frequency loading pole of said controlled element.

18. The method according to claim 17, wherein said compensating element-controlled zero is controlled by signal level regulation of a frequency dithering signal, wherein said frequency dithering signal is synchronously detected without interfering with said element control loop.

19. The method according to claim 18, wherein said signal level regulation follows frequency regulation of a variable zero provided in said common loop portion such that loop gain of said element control loop is stabilized and regulated, and bandwidth and phase margin of said element control loop is substantially constant for a range of variations in load inertia.

* * * * *